US 8,355,711 B2

(12) United States Patent  
Heins et al.

(10) Patent No.: US 8,355,711 B2
(45) Date of Patent: Jan. 15, 2013

(54) COLLABORATIVE COMPUTING FOR MOBILE DEVICES

(75) Inventors: Douglas B. Heins, San Francisco, CA (US); Gregory M. Morey, New York, NY (US)

(73) Assignee: ZeroTouchDigital, San Francisco, CA (US)

( * ) Notice: Subject to any disclaimer, the term of this patent is extended or adjusted under 35 U.S.C. 154(b) by 335 days.

(21) Appl. No.: 12/510,164

(22) Filed: Jul. 27, 2009

(65) Prior Publication Data

US 2010/0022231 A1 Jan. 28, 2010

Related U.S. Application Data

(60) Provisional application No. 61/083,892, filed on Jul. 25, 2008.

(51) Int. Cl.
*H04M 3/00* (2006.01)
(52) U.S. Cl. .......................... 455/419; 455/418; 455/420
(58) Field of Classification Search .................. 455/418, 455/419, 466, 420
See application file for complete search history.

(56) References Cited

U.S. PATENT DOCUMENTS

| | | | |
|---|---|---|---|
| 5,754,924 A | 5/1998 | Yamada et al. | |
| 6,017,157 A | 1/2000 | Garfinkle et al. | |
| 6,324,521 B1 | 11/2001 | Shiota et al. | |
| 7,013,288 B1 | 3/2006 | Reifel et al. | |
| 7,363,235 B2 | 4/2008 | Urabe et al. | |
| 7,418,274 B2 * | 8/2008 | Hood, III | 455/562.1 |
| 7,610,207 B2 | 10/2009 | Heins | |
| 2001/0044747 A1 | 11/2001 | Ramachandran et al. | |
| 2001/0049640 A1 | 12/2001 | Kurokawa et al. | |
| 2002/0065741 A1 | 5/2002 | Baum | |
| 2002/0186319 A1 | 12/2002 | Whitby et al. | |
| 2003/0038882 A1 | 2/2003 | Chauvin et al. | |
| 2003/0069809 A1 | 4/2003 | von Rosen et al. | |
| 2003/0084435 A1 * | 5/2003 | Messer et al. | 717/174 |
| 2003/0115357 A1 * | 6/2003 | Chu et al. | 709/237 |
| 2003/0200099 A1 | 10/2003 | Mauro et al. | |
| 2003/0229536 A1 | 12/2003 | House et al. | |
| 2004/0171371 A1 | 9/2004 | Paul | |
| 2004/0218045 A1 | 11/2004 | Bodnar et al. | |
| 2005/0004978 A1 | 1/2005 | Reed et al. | |
| 2005/0097173 A1 | 5/2005 | Johns et al. | |
| 2005/0225799 A1 | 10/2005 | Berarducci et al. | |
| 2009/0080336 A1 * | 3/2009 | Zhang et al. | 370/248 |

(Continued)

OTHER PUBLICATIONS

Wang, Dongyan "Two New Image Processing Algorithms and a Framework for Internet-Based Image Processing" PhD Dissertation, The University of Wisconsin-Milwaukee, United States. Retrieved Aug. 28, 2009 via ProQuest, 166 pages (Dec. 1998).

(Continued)

*Primary Examiner* — Barry Taylor
(74) *Attorney, Agent, or Firm* — Perkins Coie LLP

(57) ABSTRACT

Embodiments of the present disclosure include systems and methods for collaborative computing for mobile devices. The system includes methods for leveraging a mobile device and computing resources in a peer-to-peer network in a manner that does not require a central controlling entity, nor the transmission and/or downloading of computer-executable code (e.g., program applications) such that mobile device applications can defer the costly execution of said program applications to the collaborative computing resources in a peer-to-peer network where computing resources are cheaper and network bandwidth and connectivity is more reliable and less expensive in comparison to a mobile device.

23 Claims, 8 Drawing Sheets

U.S. PATENT DOCUMENTS

2010/0008291 A1* 1/2010 LeBlanc et al. ............... 370/328
2011/0145376 A1* 6/2011 Bates et al. .................. 709/221

OTHER PUBLICATIONS

International Search Report PCT/US04/41207 dated Oct. 30, 2006, 3 pages.
U.S. Appl. No. 61/083,892, filed Jul. 25, 2008.
U.S. Appl. No. 61/109,829, filed Oct. 30, 2008.
U.S. Appl. No. 12/559,798, filed Sep. 15, 2009.
U.S. Appl. No. 12/261,944, filed Oct. 30, 2008.
Restriction Requirement mailed May 5, 2005 in U.S. Appl. No. 10/733,830, filed Dec. 10, 2003, Issued Patent No. 7,610,207.
Non-Final Office Action mailed Aug. 9, 2006, in U.S. Appl. No. 10/733,830, filed Dec. 10, 2003, Issued Patent No. 7,610,207.
Final Office Action mailed Apr. 2, 2007 in U.S. Appl. No. 10/733,830, filed Dec. 10, 2003, Issued Patent No. 7,610,207.
Non-Final Office Action mailed May 29, 2008, in U.S. Appl. No. 10/733,830, filed Dec. 10, 2003, Issued Patent No. 7,610,207.
Non-Final Office Action mailed Dec. 24, 2008 in U.S. Appl. No. 10/733,830, filed Dec. 10, 2003, Issued Patent No. 7,610,207.
Final Office Action mailed May 27, 2009 in U.S. Appl. No. 10/733,830, filed Dec. 10, 2003, Issued Patent No. 7,610,207.
Notice of Allowance mailed Sep. 3, 2009 in U.S. Appl. No. 10/733,830, filed Dec. 10, 2003, Issued Patent No. 7,610,207.

* cited by examiner

COLLABORATIVE COMPUTING FOR MOBILE DEVICES

CLAIM OF PRIORITY

This application claims priority to U.S. Provisional Patent Application No. 61/083,892 entitled "Platform for Distributed Processing", which was filed on Jul. 25, 2008, the contents of which are incorporated by reference herein.

BACKGROUND

Clustered or distributed computing generally utilizes a central controller entity (e.g., a queue manager or controller program). As a result, these systems can be limited by a single point of failure. In other words, if the central controlling entity of the respective systems fails, then the entire system is prone to failure and may suffer from system downtime. In addition, since operation of the above systems may involve the transmission and downloading of computer-executable code, the systems are susceptible to viral infection. Moreover, clustered or distributed computing systems do not effectively scale to mobile devices.

Mobile devices typically have reduced hardware capabilities, thereby limiting the scope and number of applications which can be installed and executed on the mobile device's hardware. Given the trend to continuously miniaturize mobile devices, they generally have less memory than a computer, a slower and reduced micro-processor, and rely on a limited-capacity battery as the power source. In addition, network connectivity may be less robust as the mobile device moves in and out of network connectivity range.

The impact of a mobile application on the mobile device's battery life can depend upon, for example, the nature of the application, the demand it places on the micro-processor, and/or the length of time the radio hardware remains connected to the network. These factors, along with the trend to yet further decrease the size/form factors of mobile devices, cause a significant barrier and hindrance to the increasing trend of consumers to load and run multiple applications on mobile devices.

DETAILED DESCRIPTION

Figure 1:
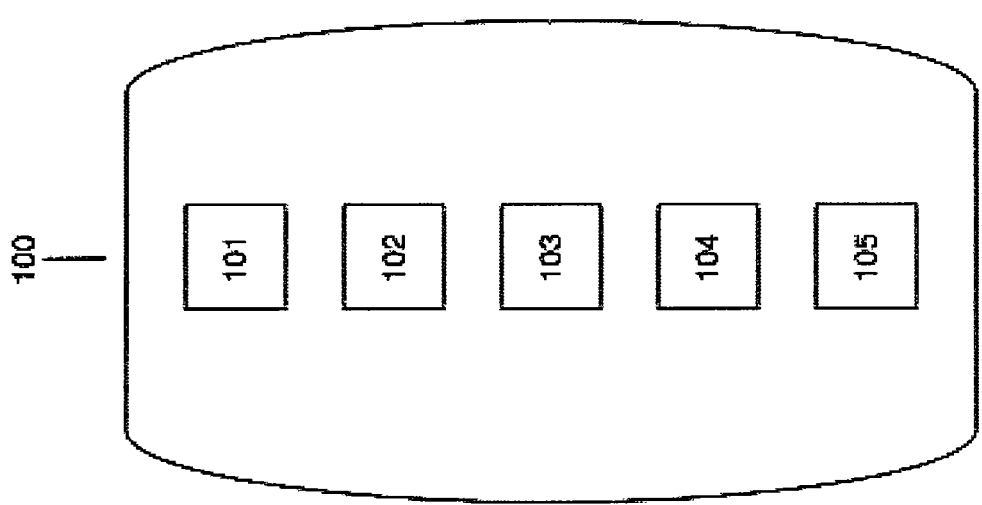
FIG. 1 depicts a mobile device with applications installed thereon.

The following description and drawings are illustrative and are not to be construed as limiting. Numerous specific details are described to provide a thorough understanding of the disclosure. However, in certain instances, well-known or details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Clustered computing typically involves a program host for storing various programs that define certain tasks or computations, multiple computing engines for performing the various tasks or computations, and a queue manager for assigning the various tasks or computations to the computing engines. The program host can then transmit the appropriate programs, together with inputs, to the computing engines. The computing engines download the programs and execute the task or computations.

Similarly, distributed computing typically involves one or more controller programs running on multiple nodes of a computer network. These controller programs control the launch and operation of multiple component programs which are also running on multiple-nodes of a computer network. Once a distributed application is composed (i.e., component programs, communication routes between component programs, and computing nodes on which the component programs are to be run are all specified a priori), a controller program disseminates launch commands and routing information which in turn, launches the respective component programs. Once launched, the component programs run continuously and remain connected to the controller program to receive data and further instructions.

The disclosed techniques relate generally to mobile device utility computing in ad-hoc and configured peer-to-peer networks. More specifically, the present disclosure provides methods and apparatus for enabling shared and distributed program execution within mobile computing devices by spanning the programs' control and execution threads across multiple computing resources.

Embodiments of the present disclosure includes systems and methods for leveraging a mobile device and computing resources in a peer-to-peer network in a manner that does not require a central controlling entity, nor the transmission and/or downloading of computer-executable code (e.g., program applications) such that mobile device applications can defer the costly execution of said program applications to the collaborative computing resources in a peer-to-peer network where computing resources are cheaper and network bandwidth and connectivity is more reliable and less expensive in comparison to a mobile device.

Various embodiments provide methods and processes for utilizing ad-hoc and/or configured networks (including, without limitation, the Internet) as a type of "micro-processor" computing platform, whose processing and execution capabilities are distributed across and throughout network devices. For example, the technique can utilize the Internet as an operating system that enables the creation and execution of a unique and proprietary form of distributed applications, initiated by application badges, whose threads of control and execution may span multiple network devices and their respective operating systems.

The present disclosure provides for spanning or sharing threads of control and execution across multiple network devices, without having to transmit or download compiled code (e.g., mobile device and/or computer software applications). For example, the control of execution can be delegated to one or more other devices in addition to or in lieu of the device used by the user to access an application (e.g., a mobile application). Execution control include processing by way of example not limitation, coordination among multiple resources, resource monitoring, exception handling, recovery, resource allocation, access right management, error handling, store/forward management, postponing fulfillment/execution, managing state of execution, etc.

Delegation of thread of control and/or thread of execution can be performed in addition to or in lieu of processes whereby applications with threads of control and threads of execution that remain resident within a single device (e.g. a copy of the software program loaded into the device), and as a result requires deployment and execution of such applications to occur locally (i.e., within the device).

These mobile and network devices form computing networks or otherwise referred to as computing social network(s) (where 'social' refers to the ability of networked devices to interact, communicate, and/or collaborate to execute program instructions and/or to perform any other computing-type tasks), and may include, without limitation, mobile phones, mobile devices, personal computers (PCs), servers, netbook computers, pagers, personal device assistants (PDAs), radio frequency identification (RFID) devices/tags, data sensors, kiosks, automatic teller machines (ATMs), wireless fidelity (WiFi) access points, routers, embedded multi-dimensional barcodes, global positioning (GPS) devices and equipment, gaming devices, multi-media devices, television/cable set-top boxes, digital still and video/audio motion cameras, security/surveillance equipment, healthcare monitoring equipment, medical imaging devices, assembly line components, and the like; and machines, equipment, hardware and devices used in business, defense operations, financial securities industries, insurance services, supply chain management, healthcare, and other similar environments, to name a few.

As a result of thread sharing, program instructions can be deployed and executed utilizing multiple devices, rather than just a single mobile device. Distributing deployment and execution capabilities across multiple devices provides for faster and more efficient program execution, and vastly expands the overall execution capabilities of each mobile device in the network, particularly since a mobile device may utilize the execution capabilities of another computing device to continue executing the program initiated by the mobile device.

A "program" or "program structure" can include mobile and/or computer software applications which include compiled, computer-executable code and can further include a proprietary structure of execution instructions that may themselves initiate the execution of code (e.g., software applications) that is hosted by a networked peer. In addition, these program instructions may be used to affect how code or other instructions are executed, and they may even be used to initiate the creation or deletion of other program instructions, or to initiate the insertion of multiple program instructions into a program structure before, during, or after the program structure has begun execution.

A program structure (or set of program instructions) in accordance with the present disclosure is one level removed (i.e., higher) from that of compiled, computer-executable code. As a result, the program instructions of the present disclosure may be transferred amongst peers without the possibility of transferring viruses, they may be inserted or removed from a program structure after execution of the program structure has commenced, and they may initiate the execution of computer-executable code, as noted above.

Notably, a program instruction may itself comprise one or more program structures. To illustrate, an example "program" of the present disclosure may include a sequence of instructions, wherein a first instruction may require a software application such as Flickr™ to execute, a second instruction may require a web application such as Facebook™ to execute, a third instruction may require an multi-media message (MMS) application to execute, a forth instruction may comprise an entirely new program structure, and so on.

Even though this "program" or sequence of instructions may be initiated by the mobile device, this "program" or set of instructions does not necessarily have to be carried-out by a single mobile device. In other words, the mobile device that initiates such a program need not have the capability of executing all of the various software applications called by the program (i.e., the mobile device need not host all the code called upon by the instructions to execute). Instead, the initiating mobile device may leverage the capabilities of one or more of the computing resources available in it's peer cloud (and even on neighboring networks and/or other peer clouds) to execute those instructions that it can not carry-out on its own.

Unlike typical distributed application programs, which simply replicate and/or transfer program applications (i.e., store and execute in its entirety) amongst multiple network devices and/or multiple virtual instances of a mobile device, and which require a central controller/server to distribute/control execution of the program applications, the present disclosure provides for the execution of a single proprietary program structure in "pieces" or in "variants" (based on personalization and customization criteria) across various network devices without requiring a central controller or server to orchestrate the overall execution of the program structure, and without having to transfer program application (i.e., code) between devices.

In other words, rather than storing the same application in multiple devices and executing that application multiple times as determined by a central controller/server, and rather than transferring a program application to multiple devices, the present disclosure provides for a proprietary program structure whereby each independent program instruction is executed once by a mobile device that hosts the appropriate code for carrying out said instruction, and whereby multiple network devices may be used to fulfill the various instructions without the need for a central controller or server, and without the need to transfer program applications. In this manner, the combined execution of all program instructions (by one or more peers in the network, including the originating mobile device) will result in the complete execution of the program structure as a result of leveraging the capabilities of multiple network devices.

As a point of reference, program replication may be found in today's instant messaging (IM) applications, distributed file sharing applications, traditional client-server applications such as web-servers, web-applications, email severs, back-office application servers, and the like.

It is important to note that unlike systems, the mobile device functionality of the present disclosure may reside across one or more networks (wired and/or wireless) of communication devices (configured or ad-hoc), rather than on any one specific physical mobile device itself. For example, in a system, a mobile device application for remote access to Facebook™ is typically resident to a single mobile device instance, executing within a thread of control within said instance. Contrarily, in one aspect of the present disclosure, for example, the thread of control may be distributed and shared across a plurality of computing devices of different types, which together comprise and form the computing social network of collaborative computing resources.

FIG. 1 depicts a mobile device 100 with applications 101-105 installed thereon.

The applications 101-105 can include, by way of example, but not limitation, mobile applications. For example, the mobile device 100 can include a Facebook™ application 101, a Flickr™ application 102, an short message service (SMS) application 103, an Internet browser application 104, and a digital and/or video application 105. Any number and type of applications can be hosted by the mobile device 100 and the number of applications that can be hosted by the mobile device can depend on the device's memory storage and the memory storage requirements of each application. For mobile devices with little memory storage for mobile applications, the number of applications may be limited.

Figure 2:
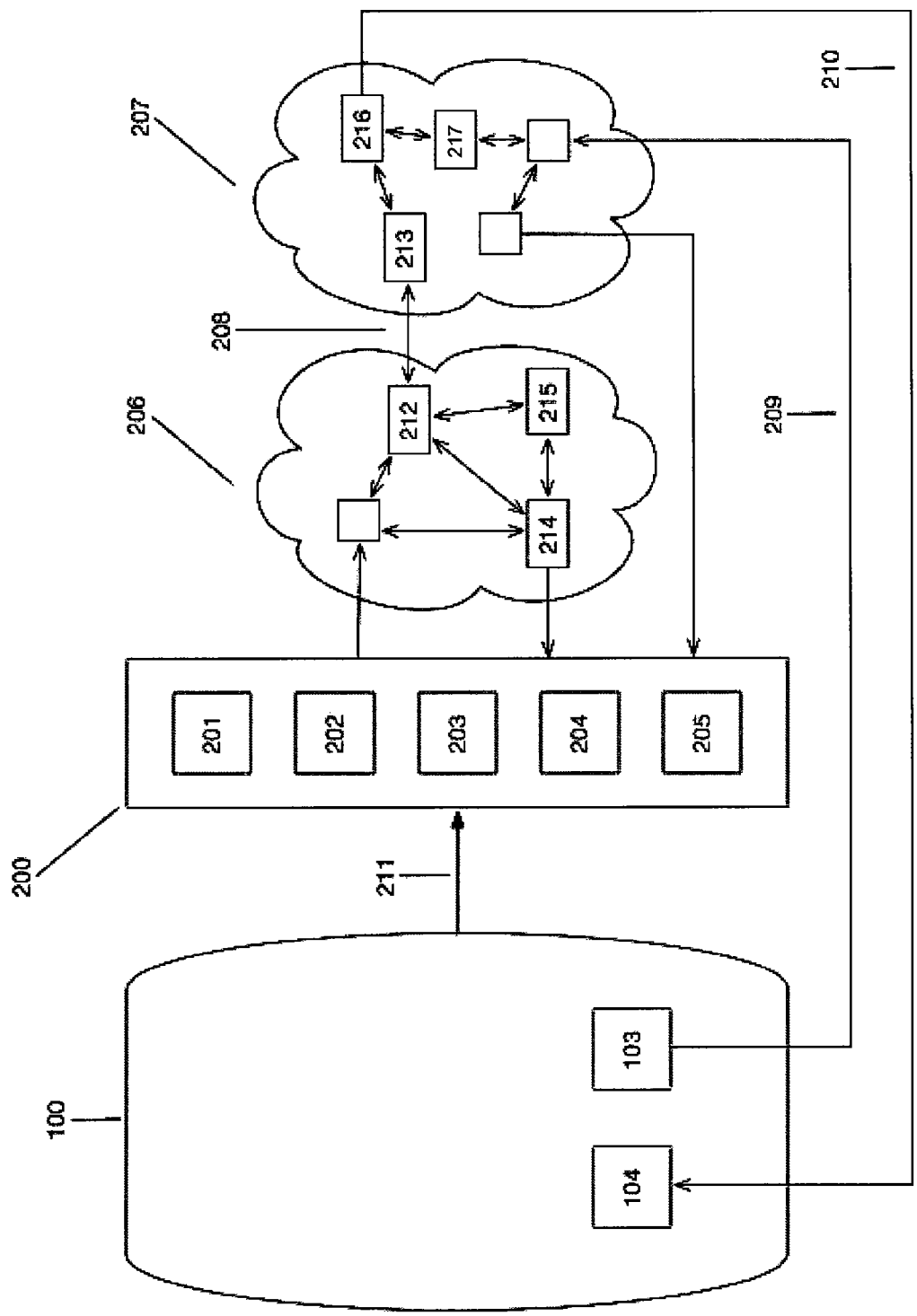
FIG. 2 depicts a mobile device configured to share resources using peer clouds.

FIG. 2 depicts a mobile device configured to share resources using peer clouds.

Included in this mobile device 100, for example, is an application wall 200. The application wall 200 can be configured to host a location based active to-do list reminder badge 201, a Starbucks™ location badge 202, a national multi-partner loyalty program badge 203, an in-house enterprise software source control dashboard badge 204, a multiple destination digital photography processing and upload badge 205. The quantity and type of mobile device applications shown in this network are illustrated as an example. Any number of mobile device application badges can be included in the application wall 200 in accordance with the present disclosure.

Furthermore, the application wall 200 can be configured to collaborate with other computing resources in an ad-hoc fashion. In addition, the application wall 200 can be configured to collaborate with peer clouds 206-207. A network of devices/resources in accordance with the present disclosure can include any number of devices. and multiple networks may be connected through common devices (or peers) serving as a "bridge" 208 between any number of adjacent social networks (or peer clouds). The robustness of the network can increase as the number and/or types of devices present in the network are increased.

Unlike mobile device applications, the mobile device 100 with the application wall 200 is able to utilize its various resources in the peer clouds 206-207 (i.e., various network peers) to execute in part or in whole the "program" initiated by an application badge 201-205. In other words, each application badge 201-205 has access to and is able to leverage the functional capabilities of the cloud 206 and/or cloud 207. Thus, any one application badge can request a particular instruction, even if that application is itself incapable of executing said instruction. An illustrative example of this concept is described below.

Suppose a user desires some information or has some sort of request. Using his mobile device 100, the user may use a SMS application 103 to send a text message via the network 209. The text message may include any sort of reminder, a question, a request, a command, etc. For example, the text message may read: "remind me to pick up shampoo" or "remind me to pick up my dry cleaning"; "notify me when my friends are nearby and share a similar interest"; "where is the nearest Starbucks™ to me"; "find points of interest from my local geo-path in this city"; "show me stores here which participate in my digital loyalty program"; "recommend a good Italian restaurant here in New York City that is within 5 blocks of my current location"; etc.

For purposes of this illustration, it is assumed that the user desires to locate a Starbucks™ coffee shop that is nearest to his current location, and as a result, generates and transmits with a SMS application 103 a text message: "where is the nearest Starbucks™ to me" to the peer cloud 207 via the network connection 209. In order to actually respond to the request, several determinations (each requiring different hardware/software capability) can be made.

Initially, the mobile device 100 can determine its geo-location. If the mobile device 100 is not equipped with or does not support Global Positioning (GPS) natively, it can defer the determination of its location to some other provider (i.e., another peer in the network 207). A parser and/or recognition software/hardware can be used to interpret the text message to understand what exactly the user is requesting (i.e., the user's intent). Once the user's intent or objective has been ascertained, the user's geo-location can be associated with the business entity of "Starbucks™" and quantified with the user's intent to find the nearest Starbucks™ store.

In addition, the association and user's intent can be communicated to a service, for example, a service which can perform two-dimensional location based map services. The geographical Starbucks™ map locations and/or the means whereby that information can be acquired can be used by the map service. Once a proximity map (showing the user's location and the nearest Starbucks™ store) is generated, a "best route" for guiding the user from his current location to the nearest Starbucks™ can be determined, using routing capabilities. That path can be returned as a text message including directions, or as a path overlay on a map rendered through a mobile web browser on the mobile device 104 via a network connection 210, for example.

In addition, the user can be offered similar shopping or 1:1 marketing campaign experiences and/or loyalty program offers of a local context while in a remote location. In a local context, a user's ability to opt-in to local merchants 1:1 marketing campaigns establishes interest with location. In a local context, a user's geo-path (defined as a collection of spatial and temporal related geo-position samples with associated meta-data) is accumulated over a period of time, for which repeated interactions with merchants and services/solutions denote pattern(s) of increased interest and/or participation.

These learned behavioral patterns can be applied even when the user is in a remote location, such that the user can benefit from services and offerings similar to those offered in the user's local context, even when the user is in a remote context (e.g., when the user is traveling). This allows global access to loyalty and brand programs that span local and remote contexts based on behavior patterns of users making use of their mobile devices as bookmarks into their behavioral interests, regardless of location.

Referring again to the example of FIG. 2, the various computing resources in the peer clouds 206 and/or 207 may be utilized collectively to execute the user's request. For example, database servers and/or services 211 may be accessed via the cloud 206 and/or 207 to retrieve store locations of various Starbucks™; application servers 212 may be utilized for its GPS triangulation capabilities; email servers 213 may be utilized for communicating information; Internet applications 104 may be used to overlay a route (from user's current location to the closest Starbucks™ store) onto a web browser illustrating for the user how to arrive at the Starbucks™.

In one embodiment, the mobile device 100 (and SMS application 103) is used as a "remote control" to initiate a request such as one to transmit a text message to the cloud 207 via the network connection 209; desktop applications 214 comprising an online proxy can be utilized to monitor and log what its owner is doing while in a mobile real-life context; legacy servers 215 can include standalone applications or command line tools which may be accessed for natural language processing and/or recognition. In addition, process and/or workflow servers 216 can be utilized to orchestrate the flow of resources to obtain a final product—which in the example given is satisfying the user's request to find the nearest Starbucks™.

The user's text message can be transformed into an application badge 202 which when executed within the application wall 200 causes a similar chain of events which can result in the same information being returned to the mobile device's Internet browser application 104. In practice, any operation and/or interaction with a mobile software program can be replaced with a badge 201-205 which simplifies the work imposed on the user of the mobile device. This "one-click" type of interaction lends itself to simplified utility for mobile device applications.

As demonstrated by the above example, the disclosed technology leverages disparate pieces of technology and/or network devices which do not necessarily "know" how to communicate with each other, and combine them to seamlessly execute a user's commands/requests. Indeed, executing instructions requiring various technologies requires the ability to merge different computing resources in order to use them in ways not previously considered. The example network of computing resources of FIG. 2 and the above description illustrates this novel ability of combining multiple computing devices and resources, some of which are hardware specific, others software centric, and others comprising both, and providing that scale and breadth of computing resources to the benefit of the mobile device.

In one embodiment, the application wall 200 is a mobile application resident to the mobile device 100. The application wall can utilize the same functionality of the mobile device in similar fashion of the other mobile device applications 101-105. This includes, but is not limited to, network connectivity (TCP/IP, HTTP, SSL, etc.), the graphic user interface functionality (radio buttons, scroll bars, text fields, edit fields, images, etc.), the system resources (SMS, MMS, EMS, GPS, telephony services, etc.).

In one embodiment, the application wall 200 provides a common execution container whereby application badges 201-205 can interact with the user and the underlying environment provided for by the mobile device 100. In general, the application wall 200 behaves like any other mobile device application 101-105, and can be initiated utilizing the same method. Once operational, the application wall 200 presents the user with a series of badges 201-205. In operation, these badges encapsulate specialized functionality which initiates a program structure to be executed across any of and any number of network computing devices (peers 211-216) in any of and any number of peer clouds 206-207.

Figure 3:
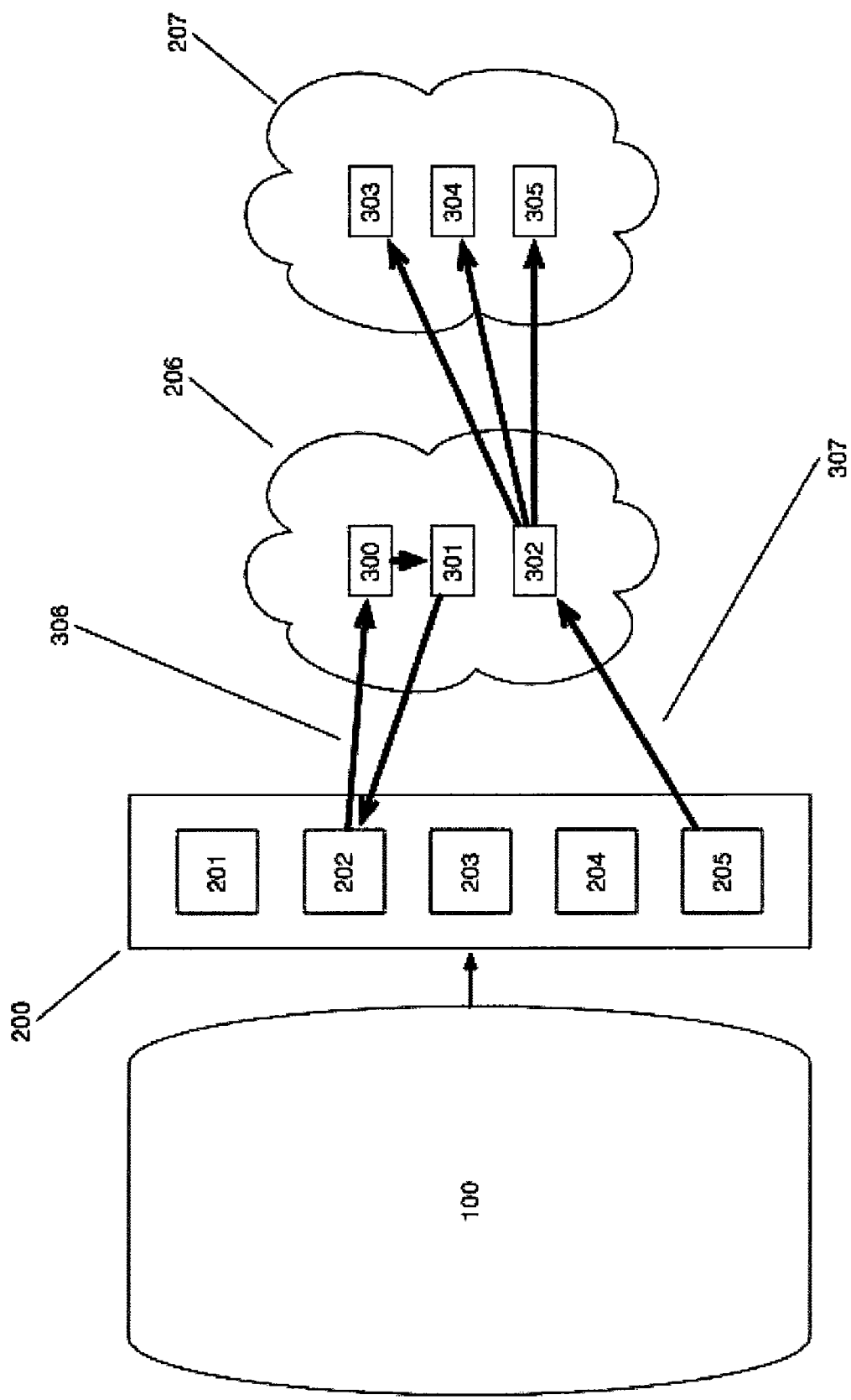
FIG. 3 depicts a mobile device in a social network of computing resources.

FIG. 3 depicts a mobile device 100 having an application wall 200 in a social network of collaborative computing resources.

The application wall 200, once networked with other network devices in peer clouds 206-207, may become a network peer of a computing social network configured in accordance with the present disclosure. One aspect of the present disclosure, for example, the thread of control may be distributed and shared across a plurality of computing devices of same or different types, which together comprise and form the computing social network of collaborative computing resources. In the example of FIG. 3, the application wall badge 202 may represent the badge to acquire the location for the nearest Starbucks™ location.

In operation, the user can select the badge 202 which can acquire from the application wall 200 as well as from the mobile device 100 requisite information for the badge to successfully execute the program; this may include by way of example, but is not limited to, the mobile device's identification (which may be the cell phone number if the mobile device is a cell phone, or some other unique global unique identifier), the date and time of invocation, and the user's information profile. This requisite information coupled with the execution of the badge generates and proceeds to execute a program to locate the nearest Starbucks™ store.

The badge 202 can request a network device 300 in the cloud 206 to continue execution of said program via a network connection 306, for example if the badge is unable to execute all of the instructions of the generated program. Network device (or peer) 300 continues execution of the program initiated by the badge 202 until at which point it is unable to continue execution and forwards the program plus any data to the network device 301 also in the peer cloud 206. Network device (or peer) 301 continues execution of the program initiated by the badge 202 until at which point the program instructs the network device 301 to return the program and any data to the application wall 200, more specifically to the application badge 202.

As an example, the user desires to take a picture utilizing the digital camera and/or video camera of the mobile device 100. Further it is assumed that the user desires to post the digital photographs to multiple destinations, such as Facebook™ 303, Flickr™ 304 and their personal computer 305. In operation, it is assumed that the user may also desire to perform additional digital image processing on the digital photographs according to personalized and customized parameters, all of which is performed by a network device (or peer) 302 prior to sending the digital photography to each of the final destinations 303-305.

The user can select the badge 205 which can acquire from the application wall 200 as well as from the mobile device 100 information for the badge to successfully execute the program; this can include but is not limited to, the mobile device's identification, the date and time of invocation, and the user's information profile, and said collection of digital photographs taken by the mobile device 100.

The badge 205 can request the network device 302 in the peer cloud 206 to continue execution of said program via a network connection 307. Peer 302 may provide additional processing by augmenting said collection of digital photographs in accordance with the personalized profile. In operation, peer 302 can also perform the necessary processing and generate a new program structure, each of which when executed in turn causes the program structure to migrate outside of the peer cloud 206 to each of the destination peers 303-305 in an adjacent peer cloud 207.

As will be appreciated by those in the art, systems and methods for uploading digital photographs from a mobile device to multiple destinations is not offered. Indeed, there is a separate device centric mobile device application for each destination desired. Further these separate mobile device applications do not offer the ability to apply digital image processing to each destination in turn.

In one embodiment, as illustrated above, a click instantiation of an application wall badge 205 causes multiple threads of execution and control to occur outside of the mobile device 100 itself. Indeed in the execution model of the application wall 200 and any number of application badges 201-205 efficiencies are gained in ways unavailable to current systems and methods. For example, a user desires to upload 5 digital photographs to 5 destinations where each digital photograph requires 200 kilobytes of memory. 25 digital photographs (5 digital photographs×5 destinations) may be required to go across a network connection, with the cost of the user being 10 megabytes (25 digital photographs×200 kilobytes per digital photograph) of data transferred. Depending on the service package of the user of the mobile device, 10 megabytes can be both expensive and slow, especially if the network connectivity is poor.

In embodiments of the present disclosure, the data transfer is ⅕ the total cost and data transfer requirement, as the data is transferred once from the mobile device 100 to the processing peer 302. Once transferred, peer 302 is able to process and continue the program initiated by badge 205 to each of the destinations 303-305 more efficiently and with lower data transfer costs. The ability to migrate the program with its associated thread of both execution and control outside of the context of the mobile device 100 has consumer as well as business potential and economic value.

Figure 4:
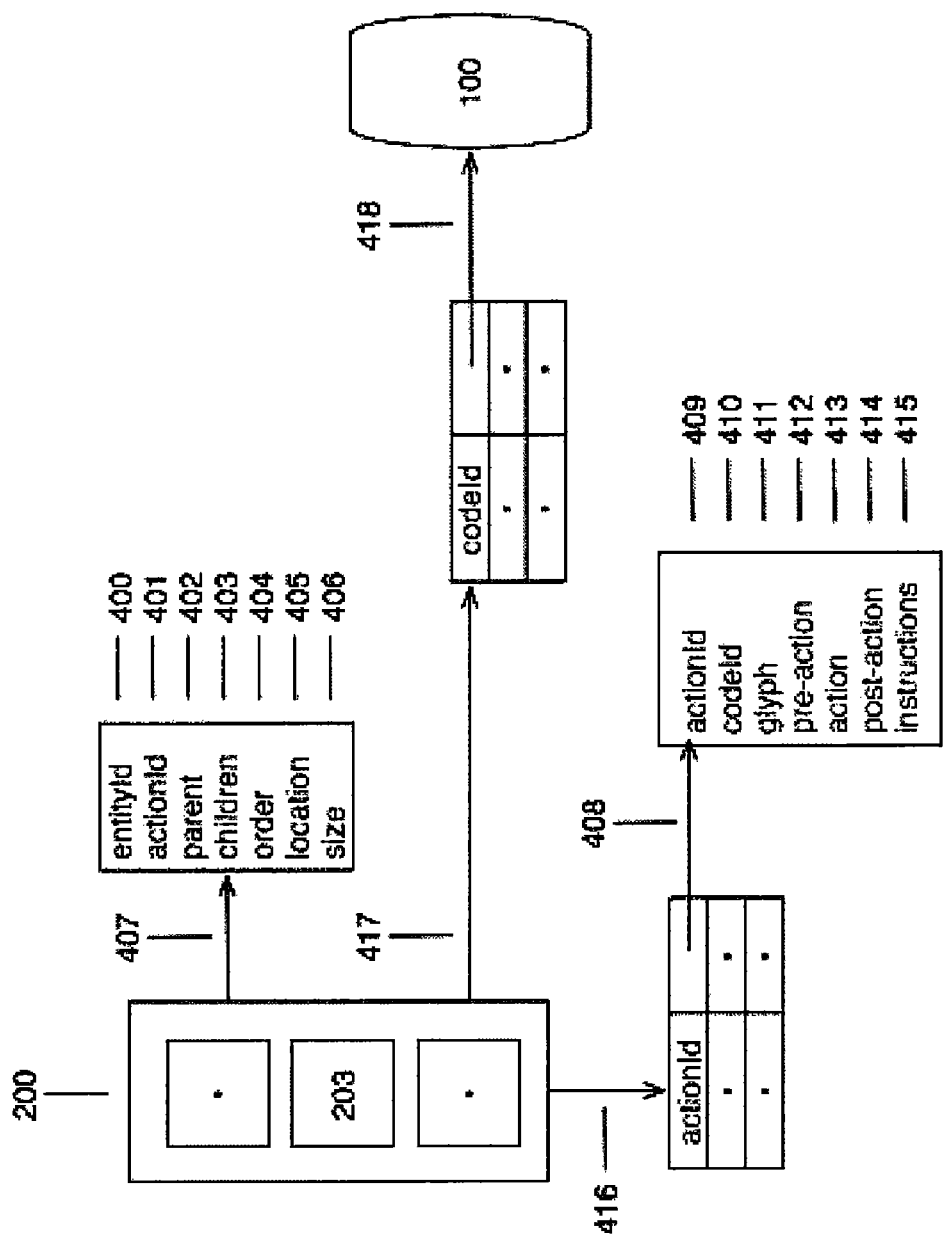
FIG. 4 depicts application user interface layers of a mobile device in a network of computing resources.

FIG. 4 depicts application user interface layers of a mobile device in a network of computing resources.

In accordance with the present disclosure, the application wall 200 is a mobile device application used to display application badges which invoke shared and distributed applications whose threads of execution and control span outside the physical mobile device itself into peer clouds 206 and/or 207 where the program continues its execution life-cycle. An example of the application wall 200 includes three entities besides the application wall itself, namely: the action table 416; the execution table 417, which points to mobile device executable code 418 within the environment of the mobile device 100; the recursive badge structure 407.

Every badge (for example 203) and the application wall 200 are represented by a badge structure 407. This structure captures the relationship of the badges within the application wall, and the compositional aspect of the badge structure through the parent 402 and the children 403 fields. This composition aspect is what gives the badge structure it simplicity, as children can be composed of further badge structures, creating a tree-like structure of actions which are linked through the actionId 401 field to the action table 416.

The badge structure 407 can include several fields. Every badge structure has a unique entityId 400 which provides unique labeling of structures when used with the parent 402 and the children 403 fields. The actionId 401 is a unique label which when referenced against the action table 416 provides a unique instance of an action structure 408. The action structure 408 represents the action that is to occur at each badge structure when visited recursively during the invocation of an application wall badge (for example, 203). The parent field 402 refers to the parent badge structure which holds said badge structure within its children field 403.

This parent field allows a child to traverse upward through the tree-like hierarchy structure as required by the action structure 408. The children field 403 is a list of badge structures which represent the compositional badge structures which represent the children of said parent. The children fields allows for a parent to have compositional sub-components which provide for additional action structures 408 to participate in the composition of the program that is generated as the result of invoking an application wall badge (for example, 203). Hierarchical structures can impose order among the badge structures 407 which comprise the children field 403; that is the purpose of the order field 404. Given the order field 404 of each badge structure 407, if the order is changed for any of the badge structures contained in the children field 403, the code generated and executed will be different. This is the power and the simplicity of compositional semantics as applied to the badge structure in general. The location field 405 specifies the "x" and the "y" coordinates of where a badge (for example, 203) will be placed within the application wall 200, providing there is a badge structure which references an action structure with an associated glyph.

An empty field value indicates that no positional semantics are provided for by the badge structure, and that information is provided for by some other badge structure either above or below said badge. The size field 406 is used to indicate the bounding box of the badge structure within the application wall 200. The bounding box specifies the "width" and the "height" of the area which can be occupied by the application badge (for example, 203). Again, an empty field value indicates that no bounding box semantics are provided for by the badge structure, and that information is provided for by some other badge structure either above or below said badge.

In the example of FIG. 4, the action structure 408 represents the action to be performed during the traversal of the tree-like badge structure composed of badge structures 407.

Each action structure may or may not be referenced by a corresponding badge structure. Which action structures that are referenced depend wholly upon the compositional aspects of the application wall badges. In operation, there will be many action structures, as each structure may tie into some specific mobile device code which can be executed to achieve some end goal (for example, obtaining the GPS location of said mobile device, or capturing the date and time to compose a timestamp to indicate when the badge was invoked, or a text edit dialog box to capture the user's pin code, for example).

Every action structure has a unique actionId 409 which provides unique labeling of structures when referenced by the badge structure 407 through the actionId field 401. The codeId 410 is a unique label which when referenced against the execution table 417 provides a unique link to a piece of mobile device code such that when executed, it generates information requisite to the action structure 408. In other words, if a first action structure referenced a codeId for GPS location, the invocation of the mobile device code 418 for GPS would result in the longitude and the latitude being captured and made manifest within the action structure. This method allows for mobile device code to be parceled in a manner that permits it to be composed in unique arrangements as specified by the tree-like hierarchy structure of the badge structure 407. The glyph field 411 is a reference to a image icon, which represents the application badge (for example, 203) within the application wall 200. As the tree-like hierarchy structure is traversed, the first badge structure which references an action structure with a containing glyph will be the glyph which will represent the badge within the application wall.

An action structure 408 can participate in the generation and the execution of the shared and distributed program as made manifest by the invocation of the application wall badge (for example, 203). To that end, the action structure is composed of four additional fields, 412-414. During the traversal of the badge structure, the action structures are called upon to generate and execute their associated semantic behavior. There maybe actions which are to be performed in advance of some main action, which is represented by the pre-action field 412. Further there maybe actions which are performed as a post process of some main action, which is represented by the post-action field 414.

An action which causes the traversal to descend the tree-like structure of badge structures is represented by the action field 414. Therefore given the tree-like structure provided for by the compositional semantics of the badge structure 407, coupled with the action structure 408 specific to each badge structure, the traversal of the badge structures provides for rich generational semantics during the generation and execution of the program as invoked by an application wall badge (for example, 203). The action structure can also provide for a list of instructions which can be utilized by the program as a result of including the action structure in some aspect of the badge structure.

These instructions are one-level higher with regard to executional semantics than the mobile device executable code (mobile device executable code is compiled and fixed, where as these instructions are interpreted and fluid), and may be utilized in the generation and execution of the program structure. For clarification purposes, the action table 416 is used to cross reference actionId 401 with a specific instance of an action structure 408 and the execution table 417 is used to cross reference codeId 410 with a specific instance of mobile device code 418 resident to the mobile device 100.

Figure 5:
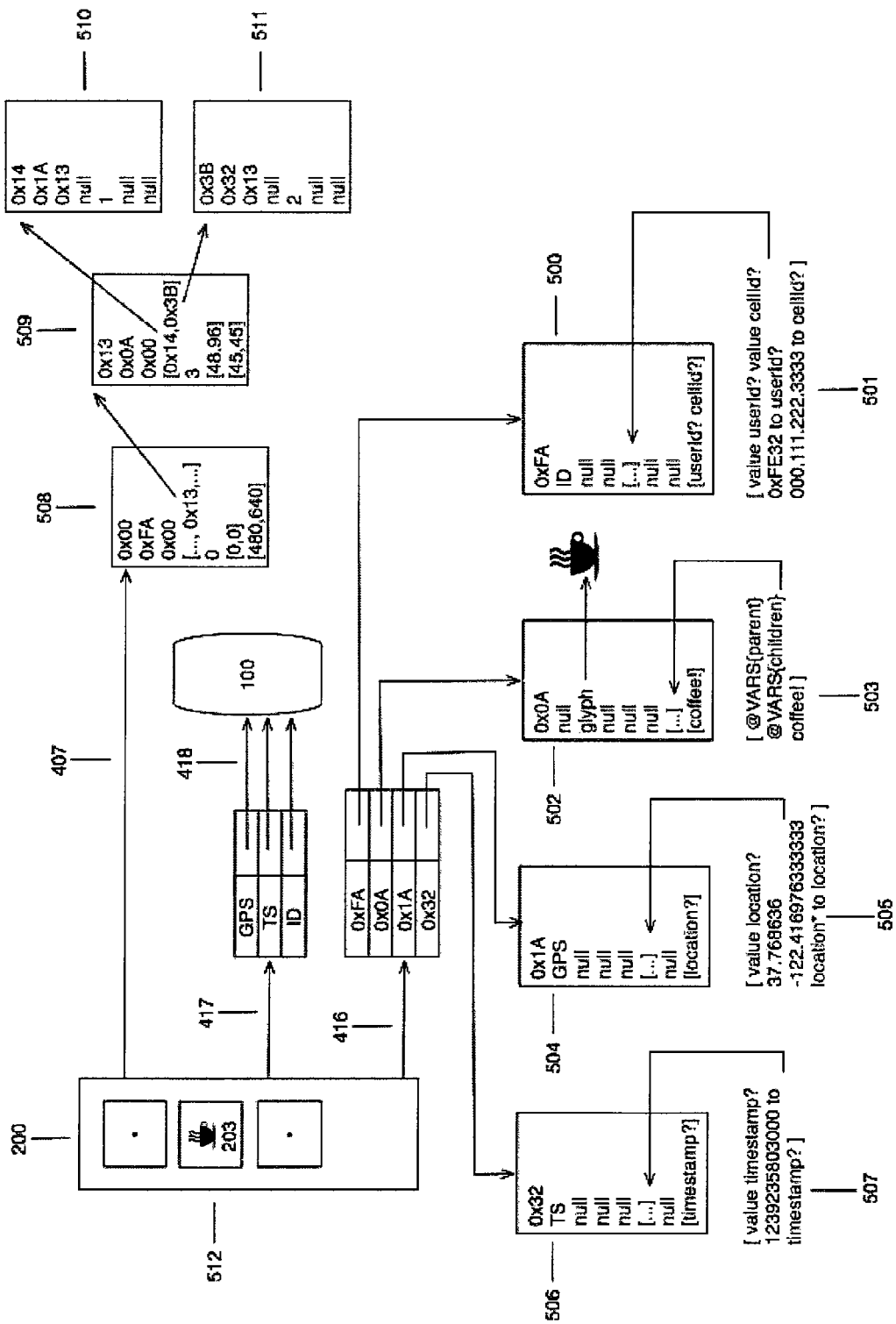
FIG. 5 depicts a structure of an application module of a mobile device.

FIG. 5 depicts a structure of an application module of a mobile device.

The example of the application wall instance 200 depicts an instantiation of the components to illustrate the generation and execution of a shared and distributed program in accordance with embodiments of the techniques herein disclosed. Starting with an action structure instance 500, it represents an action identified as 0xFA which has two instructions, namely: "userId?" and "cellId?".

Further the pre-action field of action structure instance 500 is defined by the bracketed string instance 501. This bracketed string instance 501 is the result of what is generated during the execution of the action structure instance 500, which in this illustration obtains the identification profile from the mobile device 100, by cross referencing the codeId "ID" with the execution table instance 417, linking into the mobile device 100 resident code, which when executed returns the data. This data is used to generate the bracketed string instance 501 which is assigned as the pre-action field of action structure instance 500, specifically in this illustration the "userId?" is a hexadecimal number and the "cellId?" is an international cell phone formatted string.

In the example of FIG. 5, action structure instance 502 represents an action identified as 0x0A which has one instruction, namely: "coffee!". Further the post-action field of action structure instance 502 is defined by the bracketed string instance 503. This bracketed string instance 503 is the result of what is generated during the execution of the action structure instance 502, which in this illustration does nothing as its codeId field instance is null. In this instance, the action structure instance 502 does not cross reference any mobile device code 418 as no requisite data is required from the mobile device 100. The bracketed string instance 503, which is assigned as the post-action field of action structure instance 502, specifically in this illustration the "@VARS{parent}" acquires the instructions from the parent badge structure of the referring badge structure, and similarly the "@VARS{children}" collects the instructions from all of the children badge structures of the referring badge structure. An example of this collaborative traversal is further discussed below with regard to FIG. 6.

The action structure instance 504 represents an action identified as 0x1A which has one instruction, namely: "location?". Further the action field of action structure instance 504 is defined by the bracketed string instance 505. This bracketed string instance 505 is the result of what is generated during the execution of the action structure instance 504, which in this illustration obtains the location profile from the mobile device 100, by cross referencing the codeId "GPS" with the execution table instance 417, linking into the mobile device 100 resident code, which when executed returns the data. This data can be used to generate the bracketed string instance 505 which is assigned as the action field of action structure instance 500, specifically in this illustration the "location?" is a generated entity composed from the longitude and the latitude information obtained from the requisite data.

The action structure instance 506 represents an action identified as 0x32 which has one instruction, namely: "timestamp?". Further the action field of action structure instance 506 is defined by the bracketed string instance 507. This bracketed string instance 507 is the result of what is generated during the execution of the action structure instance 506, which in this illustration obtains a timestamp from the mobile device 100, by cross referencing the codeId "TS" with the execution table instance 417, linking into the mobile device 100 resident code, which when executed returns the data. This data can be used to generate the bracketed string instance 507 which is assigned as the action field of action structure instance 506, specifically in this illustration the "timestamp?" is a 64 bit long value as obtained from the requisite data.

The action table instance 416 can include four entries, wherein each entry is identified by an actionId and the link to the action structure instance. The robustness of the action table 416 increases proportionally as the number and/or types of action structure instances (for example, 500,502,504,506) in the action table instance 416 is increased.

The execution table instance 417 can include three entries, wherein each entry is identified by a codeId and the link(s) to the mobile device code 418 which may be invoked in order to interact with the mobile device 100. The robustness of the execution table 417 increases proportionally as the number and/or types of mobile device code instances (for example, GPS, TS, ID) in the execution table instance 417 is increased.

The badge structure instance 508 represents a badge structure identified as 0x00. This badge structure instance 508 is the root badge structure 407 for the tree-like hierarchy associated with the application wall instance 200. Further the 0xFA actionId field of badge structure instance 508 cross references the action table instance 416 which links to the action structure instance 500. When the badge tree-like structure is traversed, starting with badge structure instance 508, the ensuing behavior will result in the action structure instance 500 generating the bracketed string instance 501. Further the badge structure instance 508 has no parent reference as it is the root badge structure instance. That said, it does have children, which in the illustration, badge structure instance 509 is one of the potentially many children as referenced by the badge structure id field 0x13. In addition, badge structure instance 508 is positioned at [0,0] and has the bounding box of [480,640]; all children badge structure instances will be constrained to this parent bounding box.

The badge structure instance 509 represents a badge structure identified as 0x13. This badge structure instance 509 is a child of badge structure 508 as indicated by its parent id of 0x00. Further the 0x0A actionId field of badge structure instance 509 cross references the action table instance 416 which links to the action structure instance 502. When the badge tree-like structure is traversed, the ensuing behavior when badge structure instance 509 is visited will result in the action structure instance 502 generating the bracketed string instance 503. Further the badge structure instance 508 does have children, which in the illustration, badge structure instances 510-511 are referenced by the badge structure child field [0x14, 0x3B].

In addition, badge structure instance 509 is positioned at [48, 96] within the parent badge structure instance 508 and has the bounding box of [45, 45]. Further badge structure instance 509 is ordered third within the parent badge structure instance 508 as indicated by the order field with the value 3. The badge structure instance 509 references the action structure instance 502, its visual representation is specified by the action structure instance 502 glyph field. It is this glyph which will be presented 512 on the application wall instance 200 for the application badge 203.

The badge structure instance 510 represents a badge structure identified as 0x14. This badge structure instance 510 is a child of badge structure 509 as indicated by its parent id of 0x13. Further the 0x1A actionId field of badge structure instance 510 cross references the action table instance 416 which links to the action structure instance 504. When the badge tree-like structure is traversed, the ensuing behavior when badge structure instance 510 is visited will result in the action structure instance 504 generating the bracketed string instance 505. Further the badge structure instance 510 does not have children, as indicated by the empty children field. In addition, badge structure instance 510 has no positional or bounding box requirements, as indicated by the empty size and locations fields. Further badge structure instance 510 is ordered first within the parent badge structure instance 509 as indicated by the order field with the value 1.

The badge structure instance 511 represents a badge structure identified as 0x3B. This badge structure instance 511 is a child of badge structure 509 as indicated by its parent id of 0x13. Further the 0x32 actionId field of badge structure instance 511 cross references the action table instance 416 which links to the action structure instance 506. When the badge tree-like structure is traversed, the insuing behavior when badge structure instance 511 is visited will result in the action structure instance 506 generating the bracketed string instance 507. Further the badge structure instance 511 does not have children, as indicated by the empty children field. In addition, badge structure instance 511 has no positional or bounding box requirements, as indicated by the empty size and locations fields. Further badge structure instance 511 is ordered second within the parent badge structure instance 509 as indicated by the order field with the value 2.

Figure 6:
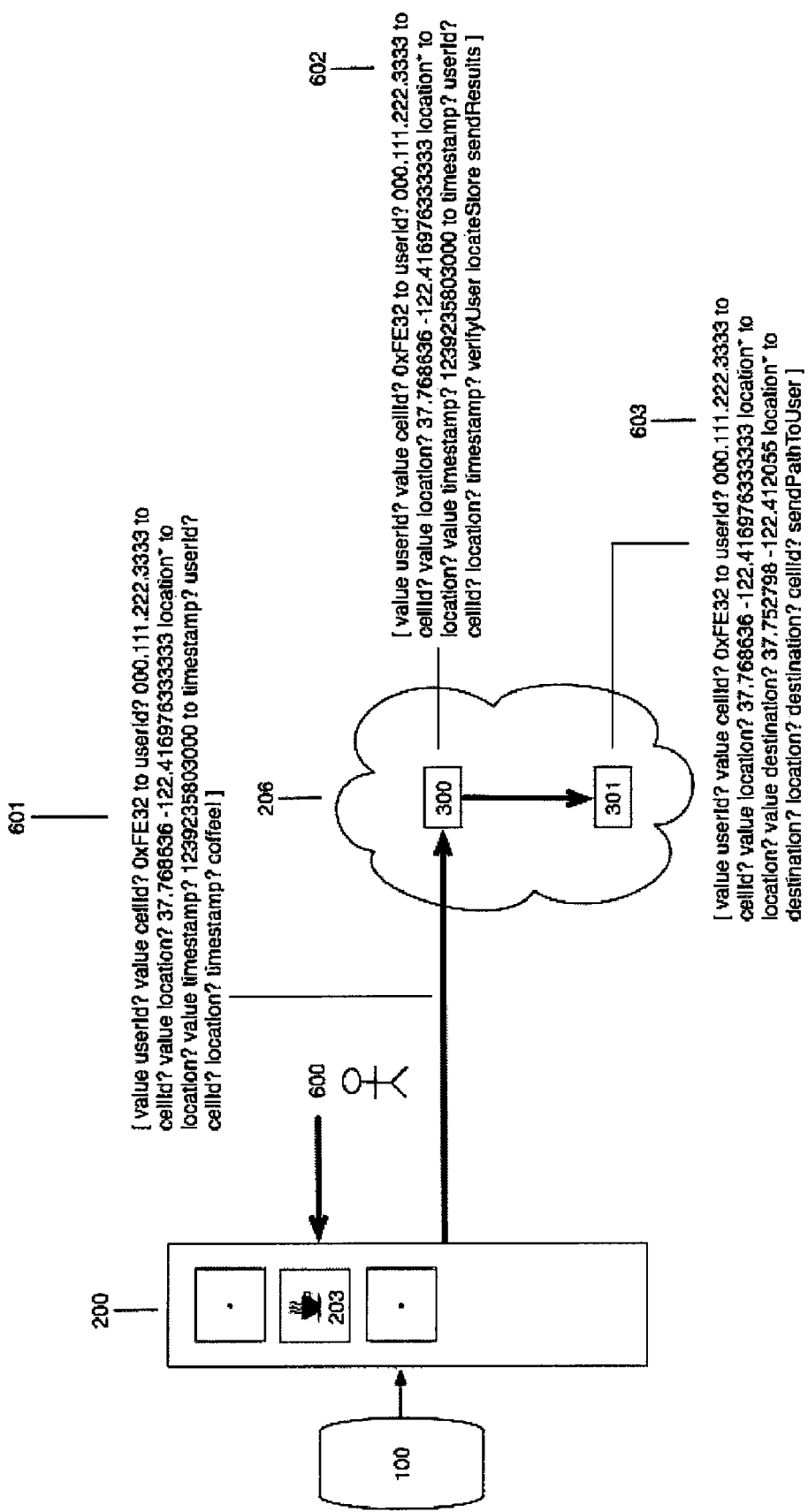
FIG. 6 depicts an example of a program instruction initiated on the mobile device, shared and distributed with a network of computing resources.

FIG. 6 depicts an example of a program instruction initiated on the mobile device, shared and distributed with a network of computing resources.

Included in the example sequence 601 are a set of instructions with data. As discussed above, not all instructions in the program sequence 601 are executed by the application wall instance 200 and may be forward to a network device (for example, peer device 300 within the peer cloud 206) for continued execution. To clarify, if the application wall instance 200 is not capable of executing the entire sequence 601, then the sequence 601 may be executed 'socially' via distributing said sequence 601 among several peers who collaborate to execute one or more instructions as required until the entire sequence 601 is executed. An example of this collaborative execution is further discussed below.

The mobile device 100 has as an application wall instance 200. The application wall instance 200 has one or more application badges (for example 203) which are instances within the tree-like structure instance 407 at a root badge structure instance 508. The user 600 invokes the application wall 200 through the same methods as invoking any standard application on the mobile device 100. In operation, the user 600 is presented a window view which represents visually the application wall instance 200. Further the visual application wall will have one or more visual glyphs (for example, 203) which represent a badge structure instance. When the user selects the glyph 203 the application wall instance 200 begins traversing the tree-like structure until it finds the badge structure referenced by this glyph, badge structure instance 509. Traversing this tree-like structure results in the program sequence of instructions 601 to be generated. In so far as the application wall instance 200 is capable of executing said instructions in the program sequence 601, it can do so.

However, when it is no longer capable of executing one or more instructions in the program sequence 601, the application wall instance 200 will forward the program sequence 601, with any requisite date, to a network device (for example, peer instance 300 in the peer cloud instance 206) which is capable of continuing the execution of the program sequence 601. In this illustration, the objective of program sequence 601 is to obtain the nearest Starbuck™ location from the userId, the cellId, the GPS location and the timestamp as requisite data. The instruction "coffee!" when executed by the peer instance 300 results in the modification of the program sequence 601 to rewrite itself to a new program sequence 602, which verifies the user and locates the nearest Starbuck™ store.

The network peer 300 continues execution of the modified program sequence 602, where upon it rewrites the program sequence 602 once again to a new program sequence 603. In operation, peer instance 300 does not execute the instruction sendPathToUser, and therefore will forward program sequence 603 to peer instance 301 which will execute the program sequence and generate the path from location to destination on behalf of the user 600.

Figure 7:
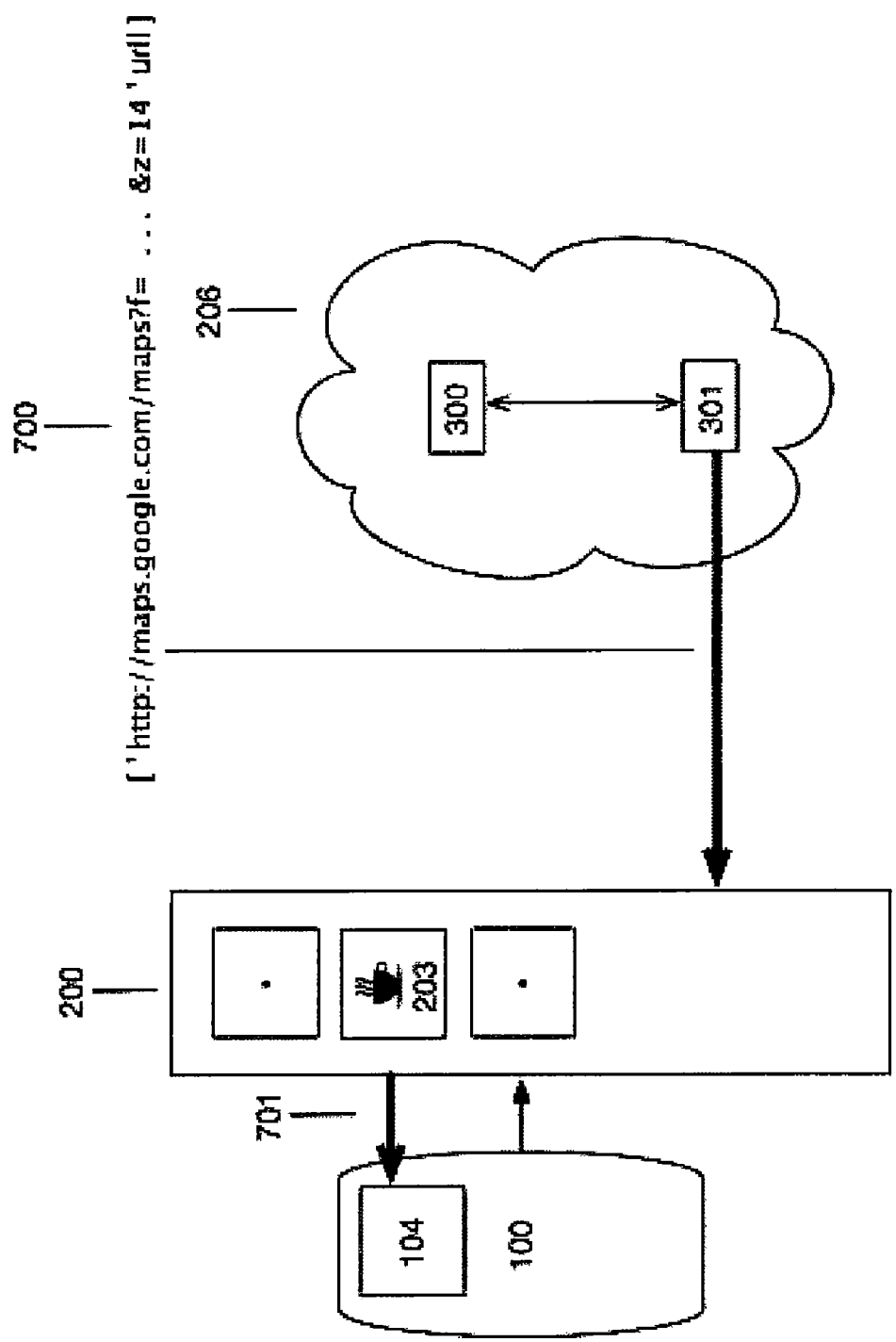
FIG. 7 depicts an example of a mobile device that receives program instructions from a network of computing resources.

FIG. 7 depicts an example of a mobile device that receives program instructions from a network of computing resources.

Included within the program sequence 700 are a set of instructions with data, the result of peer instance 301 executing program sequence 603, resulting in the program sequence 700 being send back to the application wall instance 200 within the mobile device 100. The program sequence 700 when executed by the application wall instance 200 causes the invocation 701 of the Internet browser application 104 on the mobile device 100 to display the specified URL contained in the program sequence 700, which is ultimately the path from the user's 600 current location to the nearest Starbuck™ location.

This execution pathway from the initial invocation of the application badge 203 to the final display of the path from the user's 600 location to the Starbuck™ store is the direct result of shared and distributed threads of execution and control across multiple network devices (the mobile device 100, the peers 300-301 in peer cloud 206), resulting in the user's desired goal of gaining access to information in the most simple fashion possible.

The novel mobile device computing methods, program/instruction migration, computing social networks, and/or social peer clouds discussed above may be implemented in countless industries and applications. For illustrative purposes, embodiments of the present disclosure will be described in terms of the Video Gaming, Supply Chain, and Health Care industries to name a few. It should be understood, however, that the present disclosure is not limited thereto. To the contrary, the present disclosure may be implemented in any industry.

As a first example, the present disclosure may be implemented to improve the overall gaming experience for users by expanding the functionality, efficiency, and abilities of gaming devices and by improving communications amongst users and/or gaming devices. In such an implementation, gaming devices such as cameras, video game consoles, portable video gaming consoles, web cameras, may be configured as network peers in accordance with the present disclosure. As a result, a gaming program being played say, on a video game console, may be migrated onto a handheld gaming console, where gaming may continue. To illustrate, if a user were playing a video game on a Playstation 3®, for example, the user may migrate the actual gaming session onto his handheld PSP® (or iPod, or any other hand held mobile device) and continue his gaming experience seamlessly. The user may then migrate the gaming session onto another gaming console (e.g., XBOX 360®) at a remote location.

In another gaming example, a user may use network peers (e.g., servers, cameras, GPS devices, etc.) to create a virtual game, wherein the scenery of the game is taken from the user's actual environment.

In yet another gaming example, a user may have a game which interacts on their mobile device in a very personal fashion, and as soon as a friend or some other vetted participant comes into close proximity to said user, the interactive game migrates from the said user's mobile device to the other participant's device. In this example, the network of peers forms the interactive game environment for components to migrate and continue operation on different peers where the migrating interactive game may end up back on the originating user should said user enter into proximity of a hosting participant. This example illustrates the ability to execute gaming experiences outside the originating device, thereby converting network peers into multi-user, multi-device interactive gaming platforms.

In a Supply Chain industry, networked peers (e.g., monitors, RFID tags, servers, inventory scanning devices, etc.) may be used for just-in-time (JIT) manufacturing and/or JIT-based ordering. As goods are consumed or ordered, the various peers can communicate inventory levels to each other and as a result, trigger alerts such as 'time to increase/decrease manufacturing levels', 'time to order additional raw materials', etc. This useful information may be requested by a mobile device which is incapable of executing these types of programs natively, but through the present disclosure can appear to have said capabilities by deferring to other network peers the actual execution required to achieve said objectives.

In the Healthcare industry, the present disclosure may be utilized to bring treatment to those patients whom themselves can not (or may not have time to or may not have the immediate means to) attend a hospital or doctor's office to receive treatment. For example, rather than attending a doctor's office to receive an EKG or a blood test, mobile devices configured for taking and communicating EKG or blood test readings may further be configured as network peers according to the present disclosure. This way, a patient may take his own EKG reading or a blood test using a mobile device, and have the results thereof communicated to a server peer at the doctor's office or hospital or sent to a health information exchange and forward to the most appropriate physician in an HMO plan.

The present disclosure may also be used to locate physicians, hospitals, or pharmacies when traveling outside of one's local area, or to enable secure communications between doctors and patients. To illustrate, if a patient is traveling on vacation, but forgets his/her prescription, the patient may use his/her mobile device to communicate the lost prescription to his/her doctor. The doctor may then use his mobile device to locate a pharmacy that is near the patient, and forward a new prescription to that pharmacy. Peers at the doctor's office and/or pharmacy may then communicate to the patient via their mobile device that the prescription has been filled and is ready for pick up, and provide driving directions from the patient's current location to said pharmacy.

As noted by the illustrative examples above, the present disclosure may be implemented into any industry where mobile device communications and computing functionality may be improved.

Figure 8:
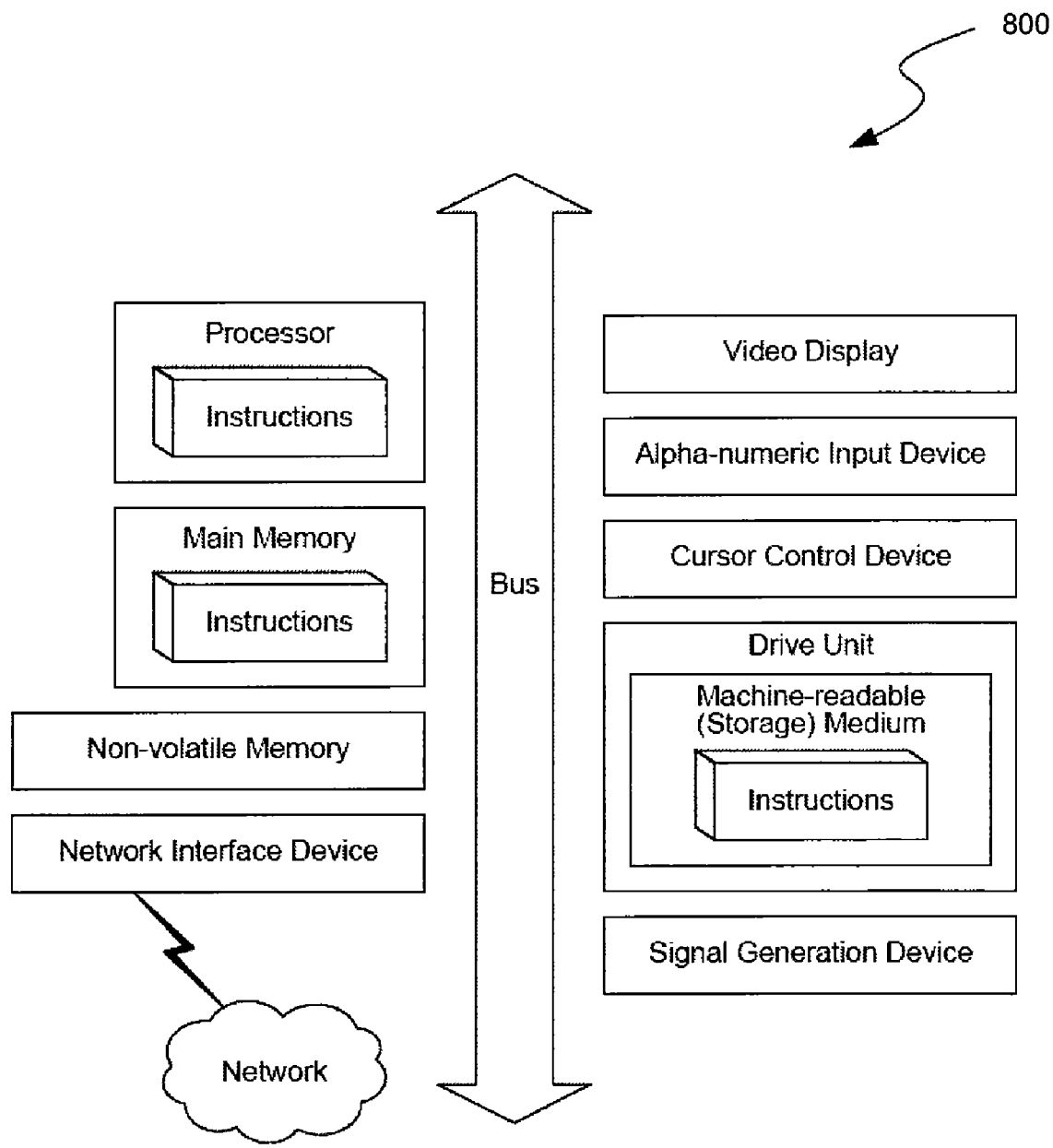
FIG. 8 shows a diagrammatic representation of a machine in the example form of a computer system within which a set of instructions, for causing the machine to perform any one or more of the methodologies discussed herein, may be executed.

In summary, the present disclosure includes methods, apparatus, software and hardware for mobile computing in ad-hoc and configured peer-to-peer networks that include (among others) the following features:

a. mobile device platform that resides on a wireless communications network, rather than entirely on the mobile device itself;

b. using a communication network (whether wired, wireless, ad-hoc, and/or configured) to function as a microprocessor for the mobile device platform, with each peer in the network comprising its own operating system and individual program execution capabilities;

c. using a peer-to-peer infrastructure for enabling shared program execution amongst a social network of devices within the same or in different computing social networks (akin to "utility computing");

d. use of a proprietary programming language which uses recursive structures to semantically "wrap" or encapsulate software applications to enable them to function as instructions that are readable by peers in the network;

e. each peers in the social network having a common or 'core' set of instructions, in addition to having its own individual instructions representing the ability to execute one or more different software applications;

f. instructions are sequenced and executed in order; one peer executes all instructions until it reaches an instruction it can not execute, at which point it will search for a peer to continue the execution; the execution path may be akin to a post priori schedule (i.e., the start and end of the instruction sequence is known, however, the actual path taken to complete the sequence is unknown);

g. alternatively, execution paths may be chosen according to previously defined routing tables; or they may be suggested by the system;

h. utility execution is accomplished without downloading any code onto the network peers; as a result, there is no chance of infecting the network peers with a virus;

i. since networks are dynamic insofar as their topology may constantly be changing, the disclosed innovative system updates and determines 'best paths' for routing execution instructions according the current peer-to-peer network topology;

j. the program instructions of the present disclosure (i.e., semantically encapsulated software applications) may be used and re-used to generate new or revised programs;

Other aspects of the present disclosure include:

a. the present disclosure provides novel means and methods for building collaborative peer-to-peer systems;

b. unlike traditional peer-to-peer system which are "data sharing" centric, instances (i.e., devices and/or networks) of the disclosure are "execution and computational sharing" centric—in other words, all forms and usages of computing and computing resources are shared and accessible to any peer as if the peer natively hosted said computing and/or computing resources;

c. the present disclosure may be implemented using both fixed (immobile) and mobile devices;

d. devices configured in accordance with the present disclosure can connect to each other and/or networks using traditional network connections and/or wireless proximal ad-hoc connections;

e. connection frameworks may utilize the broadcasting abilities inherent to mobile radio units;

f. connection frameworks may utilize the routing capability from device to device;

g. mix-and-match connections (e.g., wired and wireless) may be used to achieve sub-optimal to optimal network configurations;

h. multiple and mutually exclusive and independent peer and network configurations may be derived from the present disclosure;

i. an instance of disclosure does not require a central server, thereby enabling devices (peers) which support mobile radio sets to create proximal networks for devices which may not be in range of a wireless access point;

j. an instance of the present disclosure may run collectively among proximal devices (e.g., mobile radio sets), fixed devices, or a combination of both;

k. an instance of the present disclosure does not require network administration to be setup;

l. an instance of the present disclosure supports devices entering and exiting network configurations without having to 'know' about the devices in advance, thereby creating ad-hoc collaborative systems which may be in a constant state of flux, while maintaining the ability to run existing applications and engage in utility computing/execution;

m. an instance of the present disclosure supports distributed computing amongst computing devices;

n. an instance of the present disclosure may offload memory/processor intensive work from a mobile device to a collaborative network of peers which may include fixed computing servers, for example, where said work is executed and results of said work are returned to any number of possible destinations, one of which maybe the original mobile device;

o. an instance of the present disclosure can build a system where multiple and different computing devices as well as standalone devices may participate with each other simultaneously;

p. an instance of the present disclosure provides security preventing peers or other forms of computing devices or network hardware which are not part of the collaborative environment from 'understanding' the conversational content of said environment, thus providing "peer confidentiality";

q. an instance of the present disclosure prevents peers or other forms of computing devices or network hardware which are not authorized to participate in a particular peer-to-peer 'conversation' from participating in any aspect of said restricted or secured conversation, even though they are permitted within the confidential sphere of a said network and/or peer cloud;

r. an instance of the present disclosure may prevent peers from performing and/or executing any or all aspects of a conversation without proper and valid authentication of capability and "execution environment" intent—thus providing "execution environment" authentication and execution sandbox protection;

s. an instance of the present disclosure where peer to peer authentication is based on zero-knowledge proofs and therefore do not require a central server or a shared encryption key—thus providing for a collaboration environment which is self-secured and can not be coerced for encryption information;

t. an instance of the present disclosure enables peers to be aware of other peers' capabilities and 'intent' and therefore create on-the-fly knowledge representations of the peer environment—thus providing for dynamic routing tables for conversations;

u. an instance of the present disclosure enables peers to facilitate in the migration and transfer of a conversation based on the intended results of the conversation and the intended purpose(s) of said peers in configuration—thus providing for realtime routing optimization;

v. an instance of the present disclosure supports applications which may execute on top of the whole such that the "execution environment" morphs and migrates across a sub-set of peers in order to achieve the execution results;

w. an instance of the present disclosure supports multiple mutual exclusive and independent "execution environments" known as conversations—said conversations may involve as many peers required to achieve its completion where said conversations migrate from one peer to another peer or to multiple peers in the case of multicast conversations in order to execute;

x. an instance of the present disclosure supports conversations being altered, mutated, rewritten, and self-modified in order to achieve an execution objective, thus conversations are dynamic and the nature and content can change to achieve objective;
y. an instance of the present disclosure supports conversation containing instructions common to all peers regardless of their configuration, and may also contain instructions which are specific to a single peer or group of peers;
z. an instance of the present disclosure provides for routing conversations using information provided by one or more peers in a group;
aa. an instance of the present disclosure enables conversations to "execute" in different spatial configurations (e.g., different peers during its execution lifetime) or in different temporal configurations (e.g., conversation is postponed due to restricted resources, key peer missing from conversation, stored-and-forward at a specified future time, or triggered when certain events take place);
bb. an instance of the present disclosure may be used to offer or 'lease' one or all of the collaborative functional abilities of a group of collaborative peers to other peers that are not a part of the collaborative network—in other words, the present disclosure supports leasing of network conversations, services, peer participation, peer group affiliation, connections, collaboration, etc.
cc. an instance of the present disclosure creates new means and methods for creating ad-hoc collaborative utility computing of scale and of reach across mobile and immobile computing devices;

FIG. 8 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a pure peer-to-peer (or distributed) network environment.

The machine may be, but is not limited to, a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶13, other aspects may likewise be embodied as a means-plus-function claim, or in other forms, such as being embodied in a computer-readable medium. (Any claims intended to be treated under 35 U.S.C. §112, ¶13 will begin with the words "means for".) Accordingly, the applicant reserves the right to add additional claims after filing the application to pursue such additional claim forms for other aspects of the disclosure.

What is claimed is:

1. A method of collaborative computing in a distributed mobile device program execution platform, the method comprising,
using a communication network with multiple peer computing devices for processing in the distributed mobile device program execution platform; wherein, a peer computing device in the communication network includes an operating system, a local compiled program, and individual program execution and resource capabilities;
and
leveraging a peer-to-peer infrastructure for enabling distributed program execution with shared resources and shared program execution capabilities among the multiple peer computing devices in the communication network to execute one or more portions of the distributed program, the distributed program initiated by one or more applications on a mobile device connected to the communication network;
wherein the collaborative computing does not require a central controlling entity and wherein leveraging the peer-to-peer network includes transferring, in response to determining that the peer computing device includes the local compiled program unavailable on the mobile device, an instruction to the peer computing device for executing the local compiled program.

2. The method of claim 1, wherein the peer computing device executes a portion of the distributed program and identifies another peer computing device to execute another portion of the distributed program.

3. The method of claim 2, further comprising:
querying one or more of the multiple computing devices to identify a receiving peer computing device;
transferring the program execution, together with any data, to the receiving peer computing device;
wherein the peer computing device is in possession of the program execution and wherein said receiving peer computing device is identified as capable of continuing execution of the distributed program.

4. The method of claim 3, further comprising, transferring the program execution, together with any data, to said receiving peer to execute at least the portion calling for the running of the distributed program.

5. The method of claim 2, wherein, upon execution of the distributed program, the one or more applications are executed and resultant data transmitted to multiple destinations; wherein the multiple destinations includes the mobile device.

6. The method of claim 2, wherein, the peer computing device controls execution of the distributed program.

7. The method of claim 6, wherein, the control includes performing, one or more of, resource monitoring and resource allocation.

8. The method of claim 6, wherein, the control includes performing, one or more of, recovery, exception handling, and error handling.

9. The method of claim 6, wherein, the control includes performing, execution state management.

10. The method of claim 1, wherein the peer computing device and the another peer computing device form an execution path.

11. The method of claim 10, wherein the execution path is chosen according to routing tables.

12. The method of claim 10, wherein the execution path is determined ad-hoc by one or more of the network of peer computing devices.

13. The method of claim 10, wherein, the execution path includes multiple execution environments which execute portions of the instruction set independently of one another.

14. The method of claim 1, wherein the multiple peer computing devices are connected to each other via wireless proximal ad-hoc connections.

15. The method of claim 14, wherein the multiple peer computing devices are connected to each other via wired connections.

16. The method of claim 1, wherein, the multiple peer computing devices includes additional mobile devices.

17. The method of claim 16, wherein, mobile devices include, one or more of, cell phones, PDAs, RFID tags, data sensors, remote web-cams.

18. The method of claim 16, wherein, the multiple peer computing devices further includes computer servers.

19. The method of claim 18, wherein, the computer servers include, one or more of, personal computers, headless servers, media set-top boxes, and game players.

20. A machine-readable storage medium having stored thereon a set of instructions which when executed perform a method of a mobile device platform, the method, comprising,
using a communication network with multiple peer computing devices for processing in the distributed mobile device program execution platform; wherein, a peer computing device in the communication network includes an operating system, a local compiled program, and individual program execution and resource capabilities;

and
leveraging a peer-to-peer infrastructure for enabling distributed program execution with shared resources and shared program execution capabilities among the multiple peer computing devices in the communication network to execute one or more portions of the distributed program, the distributed program initiated by one or more applications on a mobile device connected to the communication network;

wherein the collaborative computing does not require a central controlling entity, and wherein leveraging the peer-to-peer network includes transferring, in response to determining that the peer computing device includes the local compiled program unavailable on the mobile device, an instruction to the peer computing device for executing the local compiled program.

21. The method of claim 20, wherein the peer computing device executes a portion of an instruction set and identifies another peer computing device to execute another portion of the instruction set.

22. The method of claim 20,
wherein the peer computing device and the another peer computing device form an execution path;
wherein, the peer computing device is configured to perform health care related tasks.

23. A system of a mobile device platform, the system, comprising,
means for, using a communication network with multiple peer computing devices to function as a microprocessor for the mobile device platform,
wherein, a peer computing device of the multiple peer computing devices includes an operating system, a local compiled program, and individual program execution capabilities;
means for, leveraging a peer-to-peer infrastructure for enabling shared program execution resources among the multiple peer computing devices in the communication network to execute one or more applications on a mobile device connected to the communication network;
wherein the collaborative computing does not require a central controlling entity, and wherein leveraging the peer-to-peer network includes transferring, in response to determining that the peer computing device includes the local compiled program unavailable on the mobile device, an instruction to the peer computing device for executing the local compiled program.

* * * * *